(12) United States Patent
Hayashi et al.

(10) Patent No.: US 9,436,151 B2
(45) Date of Patent: Sep. 6, 2016

(54) ELECTROPHOTOGRAPHIC DEVICE MEMBER

(71) Applicant: SUMITOMO RIKO COMPANY LIMITED, Komaki-shi, Aichi (JP)

(72) Inventors: Yosuke Hayashi, Aichi (JP); Shuichi Egawa, Shizuoka (JP); Keiichi Inoue, Shizuoka (JP); Kazushi Yamaguchi, Shizuoka (JP); Kazuhiro Iida, Shizuoka (JP); Kentaro Imai, Aichi (JP); Masanori Ishida, Aichi (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 14/691,073

(22) Filed: Apr. 20, 2015

(65) Prior Publication Data

US 2015/0248101 A1 Sep. 3, 2015

Related U.S. Application Data

(63) Continuation of application No. PCT/JP2014/058405, filed on Mar. 26, 2014.

(30) Foreign Application Priority Data

Mar. 29, 2013 (JP) .................................. 2013-071816

(51) Int. Cl.
*G03G 15/00* (2006.01)
*G03G 21/00* (2006.01)
*G03G 15/02* (2006.01)
*G03G 15/08* (2006.01)
*G03G 15/16* (2006.01)
*G03G 5/147* (2006.01)
*C08G 77/38* (2006.01)
*G03G 9/16* (2006.01)

(52) U.S. Cl.
CPC .......... *G03G 21/0017* (2013.01); *C08G 77/38* (2013.01); *G03G 5/14726* (2013.01);

(Continued)

(58) Field of Classification Search
CPC ................ G03G 15/08; G03G 2215/0855; G03G 2215/1614; G03G 2215/1619; G03G 2215/2048
See application file for complete search history.

(56) References Cited

U.S. PATENT DOCUMENTS

| | | | |
|---|---|---|---|
| 6,074,698 A | 6/2000 | Sakurai et al. | |
| 8,383,234 B2 * | 2/2013 | Mayuzumi ......... | G03G 15/0233 399/111 |
| 2011/0086981 A1 | 4/2011 | Ashiura et al. | |

FOREIGN PATENT DOCUMENTS

| | | |
|---|---|---|
| JP | 06-25450 A | 2/1994 |
| JP | 11-172027 A | 6/1999 |

(Continued)

OTHER PUBLICATIONS

International Search Report dated Jun. 24, 2014, issued in corresponding application No. PCT/JP2014/058405.

(Continued)

*Primary Examiner* — Hoa V Le

(74) *Attorney, Agent, or Firm* — Westerman, Hattori, Daniels & Adrian, LLP

(57) ABSTRACT

An electrophotographic device member can be configured as a roll member 1, a blade member 2, a belt member 3 or the like, and a modified rubber elastic body 12 is used as a material for a portion including the surfaces of the respective members. The modified rubber elastic body 12 has a rubber elastic body 121 having rubber elasticity and a surface-treated layer 122 composed of a cured product of photocurable composition impregnated into the rubber elastic body 121 from the surface thereof. The photocurable composition is configured to include a (meth)acryl monomer, a photopolymerizable polymer having a silicone group and/or a fluorine-containing group and a (meth)acryloyl group in a molecule, and a photopolymerization initiator.

20 Claims, 4 Drawing Sheets

(52) U.S. Cl.
CPC ...... *G03G5/14734* (2013.01); *G03G 5/14786* (2013.01); *G03G 9/16* (2013.01); *G03G 15/0233* (2013.01); *G03G 15/0818* (2013.01); *G03G 15/1685* (2013.01)

(56) References Cited

FOREIGN PATENT DOCUMENTS

| JP | 2004-191637 A | 7/2004 |
|----|---------------|--------|
| JP | 2008-116783 A | 5/2008 |
| JP | 2009-145798 A | 7/2009 |
| JP | 4462469 B2 | 5/2010 |
| JP | 2010-241915 A | 10/2010 |
| JP | 2011-219520 A | 11/2011 |

OTHER PUBLICATIONS

Notification of Transmittal of Translation of the International Preliminary Report on Patentability (Form PCT/IB/338) issued in counterpart International Application No. PCT/JP2014/058405 mailed Oct. 8, 2015 with Forms PCT/IB/373 and PCT/ISA/237 (6 pages).

* cited by examiner

ELECTROPHOTOGRAPHIC DEVICE MEMBER

TECHNICAL FIELD

The present invention relates to an electrophotographic device member and, in particular, to an electrophotographic device member using a modified rubber elastic body.

BACKGROUND ART

Conventionally, rubber elastic bodies with rubber elasticity have been used in various fields. Rubber forming the rubber elastic bodies as a main material generally has flexibility due to rubber elasticity, whereas the rubber has disadvantageous properties due to strong adhesiveness, such as adhesion of powder and poor slidability. Therefore, in some cases, the surface of the rubber elastic bodies is modified for use by surface treatment in order to improve the surface function.

For example, Patent Document 1 discloses a technique to provide a surface-treated layer to an elastic roll for use in an image forming device employing an electrophotographic system by impregnating an acryl monomer into the surface of a rubber elastic layer mainly composed of epichlorohydrin rubber and then irradiating the layer with ultraviolet rays.

PRIOR ART DOCUMENTS

Patent Documents

Patent Document 1: JP 4462469

SUMMARY OF THE INVENTION

Problems to be Solved by the Invention

However, when the rubber elastic layer is impregnated with an acryl monomer and then is cured by an ultraviolet ray, a resultant material of the surface of the rubber elastic layer is a normal acryl resin. The acryl resin is a material having a great dynamic friction coefficient and poor slidability, and powders adhered to the surface cannot be easily released. Therefore, in the prior art, powder releasability (a property that powder adhered to the surface is easily released therefrom) and low friction property in the rubber elastic body surface, were hardly compatible.

An image forming device employing an electrophotographic system is one example of the fields in which powder releasability and low friction property are required for the rubber elastic body surface. In the image forming device, various electrophotographic device members provided with rubber elastic body, such as a developing member, a charging member, a transferring member and a cleaning member are incorporated. These electrophotographic device members are usually used in contact with a counterpart member such as a photoreceptor or a blade member in the presence of a toner as a powder. Therefore, the rubber elastic body to be applied to these members is especially required to have both toner releasability and low friction property.

The present invention has been made in light of such background, and also has been made with intention to provide an electrophotographic device member using a modified rubber elastic body which can attain both toner releasability and low friction property, and an electrophotographic device member.

Solutions to the Problems

One aspect of the present invention provides an electrophotographic device member for use in an electrophotographic device including a modified rubber elastic body as a material for a portion including a surface of the electrophotographic device member. The modified rubber elastic body includes:

a rubber elastic body with rubber elasticity; and a surface-treated layer composed of a cured product of photocurable composition impregnated into the rubber elastic body from the surface of the rubber elastic body, the photocurable composition including:

a (meth)acryl monomer;

a photopolymerizable polymer having a silicone group and/or a fluorine-containing group, and a (meth)acryloyl group in a molecule; and a photopolymerization initiator.

Effects of the Invention

The electrophotographic device member includes the modified rubber elastic body as a material for a portion including a surface of the electrophotographic device member. The modified rubber elastic body has a surface-treated layer composed of the above-specified cured product of photocurable composition. Therefore, The electrophotographic device member can attain both toner releasability and low friction property. The reason for this is considered to be as follows.

When a photocurable composition is impregnated into a rubber elastic body from the surface thereof, a monomer component, i.e., a (meth)acryl monomer, penetrates inside from the surface of the rubber elastic body, whereas a polymer component, i.e., a photopolymerizable polymer, hardly penetrates inside from the surface of the rubber elastic body and remains on the surface of the rubber elastic body. The photopolymerizable polymer has a silicone group and/or a fluorine-containing group and a (meth)acryloyl group in a molecule. When the photocurable composition is photo-cured in this state, the (meth)acryl monomer present within the rubber elastic body is chemically bound to a (meth)acryloyl group of the photopolymerizable polymer present on the surface of the rubber elastic body so as to produce a polymer while forming a network. Therefore, the modified rubber elastic body is considered to allow for easy release of powder such as a toner adhered to the surface of the body and also to reduce surface friction, by virtue of synergistic effects of the increased hardness caused by curing of the photocurable composition near the surface of the rubber elastic body and the silicone group and/or fluorine-containing group present mainly on the surface of the rubber elastic body.

MODE FOR CARRYING OUT THE INVENTION

Figure 1:
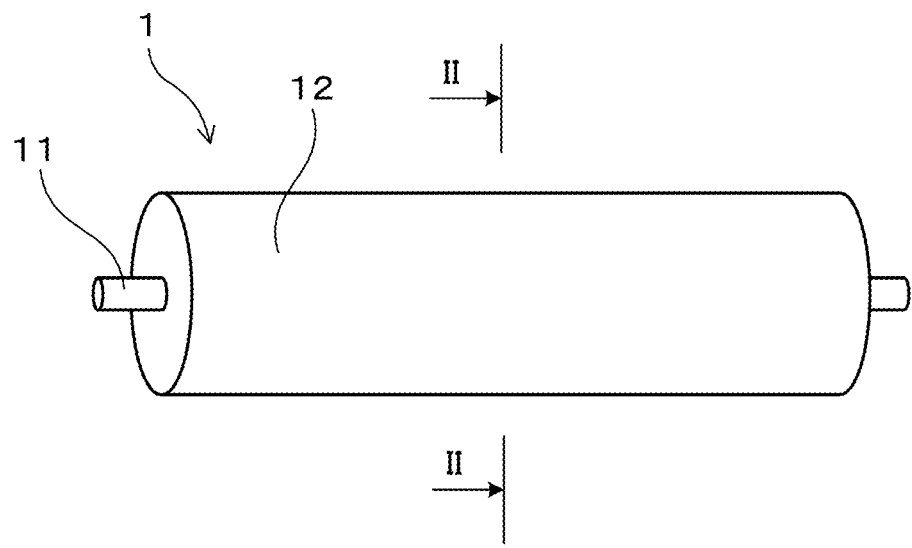
FIG. 1 is a view schematically showing a roll member as an electrophotographic device member in an Example to which a modified rubber elastic body is applied.

The electrophotographic device member will now be explained. The modified rubber elastic body for a material for a portion including a surface of the electrophotographic device member has a rubber elastic body and a surface-treated layer.

The rubber elastic body has rubber elasticity. The rubber elastic body can typically be composed mainly of rubber (the rubber includes also an elastomer (this definition will be omitted hereinafter)). In the meantime, the phrase "composed mainly of rubber" means that the rubber elastic body can include various additives in addition to rubber so long as it does not lose rubber elasticity.

Specific examples of the rubber can include acrylonitrile-butadiene rubber (NBR), butadiene rubber (BR), styrene-butadiene rubber (SBR), butyl rubber (IIR), chloroprene rubber (CR), hydrin rubber (ECO, CO), isoprene rubber (IR), urethane rubber (U), silicone rubber (Q), ethylene-propylene-diene rubber (EPDM) and natural rubber (NR). These rubbers can be used singly, or in combination of at least two kinds thereof. The rubber may be either cross-linked or non-crosslinked and may be either non-foamed or foamed.

Examples of the additives can include conducting agents such as electron conducting agents including carbon-based conductive materials such as carbon black, carbon nanotube and graphite, electrically conductive metal oxides such as barium titanate, $c$-$TiO_2$, $c$-$ZnO$ and $c$-$SnO_2$ ("c-" means electric conductivity), and metal nanoparticles; and ion conducting agents including quaternary ammonium salts, boric acid salts, perchloric acid salts and ion liquids. These additives can be used singly, or in combination of at least two kinds thereof. The conducting agent contained in the rubber elastic body can impart electric conductivity to the modified rubber elastic body.

In addition to the conducting agent, examples of the additives can also include fillers (inorganic and organic), flame retardants (inorganic and organic), plasticizers, softening agents, lubricants, processing aids, crosslinking agents, crosslinking aids, vulcanization promoters, antioxidants, coupling agents, reaction catalysts, dispersants, leveling agents and particles for roughness formation. These additives can be used singly, or in combination of at least two kinds thereof.

As the shape of the rubber elastic body, an optimum shape can be appropriately selected depending on the member to which the modified rubber elastic body is applied. Examples of the shape of the rubber elastic body include approximately columnar shape (for example, roll shape), approximately cylindrical shape (for example, belt shape), planar shape, sheet shape, film shape and membrane shape.

The surface-treated layer can be present mainly within a range of about several micro meters, specifically, for example, up to about 3 μm, preferably up to about 2 μm, more preferably up to about 1.5 μm inward from the surface of the rubber elastic body. Basically, the surface-treated layer is mostly present inward from the surface of the rubber elastic body. However, the surface-treated layer may partly be present outward from the surface of the rubber elastic body. The surface-treated layer can be configured so as to be partly present within a range of up to about 1 μm, preferably up to about 0.7 μm, more preferably up to about 0.5 μm outward from the surface of the rubber elastic body.

The surface-treated layer is composed of a cured product of photocurable composition impregnated into the rubber elastic body from the surface thereof. The photocurable composition comprises at least a (meth)acryl monomer, a photopolymerizable polymer and a photopolymerization initiator.

The monomer herein referred to as "(meth)acryl monomer" can include not only acryl monomers but also methacryl monomers. Specifically, the photocurable composition may include either one of acryl monomers and methacryl monomers, or may include both of them. Also, the photocurable composition can include at least one kind of (meth) acryl monomers of the same type or different types.

As the (meth)acryl monomer, a polyfunctional monomer having a plurality of (meth)acryloyl groups can be suitably used. In the meantime, "(meth)acryloyl group" referred herein can include not only acryloyl groups but also (meth) acryloyl groups (this definition will be applied similarly through the entire description and will be omitted hereinafter).

In this case, both toner releasability and low friction property can be surely compatible in the modified rubber elastic body in the electrophotographic device member. This can be considered to be due to the fact that the (meth)acryl monomer which has penetrated inside of the rubber elastic body and the (meth)acryloyl group of the photopolymerizable polymer present on the rubber elastic body surface are easily chemically bound together during photo-curing of the photocurable composition because the polyfunctional monomer has the plurality of (meth)acryloyl groups.

The (meth)acryl monomer preferably has a number average molecular weight within the range of 200 to 700.

In this case, the impregnation of the photocurable composition into the rubber elastic body is good and also unevenness in surface treatment is easily suppressed. Accordingly, the surface-treated layer easily becomes relatively uniform. As a result, in this case, the modified rubber elastic body in the electrophotographic device member can attain excellent stability in toner releasability and low friction property.

The number average molecular weight of the (meth)acryl monomer can be defined as preferably 70 or more, more preferably 100 or more, even more preferably 200 or more. This is because, when the photocurable composition is impregnated into the surface of the rubber elastic body, the viscosity of the photocurable composition is not too low, and repellence of the composition on the rubber elastic body surface s hardly occurs, so that the unevenness in surface treatment is easily suppressed. On the other hand, the number average molecular weight of the (meth)acryl monomer can be defined as preferably 1000 or less, more preferably 850 or less, even more preferably 700 or less. This is because, when the photocurable composition is impregnated into the surface of the rubber elastic body, the (meth)acryl monomer is easily impregnated into the rubber elastic body, so that the unevenness in surface treatment is easily suppressed.

Specific examples of the (meth)acryl monomer can include monofunctional (meth)acryl monomers such as methyl methacrylate and 2-hydroxyethyl methacrylate; and polyfunctional (meth)acryl monomers such as pentaerythritol tri(meth)acrylate, pentaerythritol tetra(meth)acrylate, isocyanuric acid EO (ethylene oxide (omitted below))-modified di(meth)acrylate, isocyanuric acid EO-modified tri (meth)acrylate and trimethylolpropane tri(meth)acrylate. These monomers can be used singly, or at least two kinds thereof can be used in combination. Among these monomers, a polyfunctional (meth)acryl monomer can be suitably used from the viewpoint of the reactivity with the photopolymerizable polymer.

The photopolymerizable polymer has, at least, a silicone group and/or a fluorine-containing group and a (meth) acryloyl group in its molecule. The photopolymerizable polymer may have either one or both of a silicone group and a fluorine-containing group in its molecule. The photopolymerizable polymer, when having both a silicone group and a fluorine-containing group in its molecule, is beneficial because both powder releasability and low friction property are further easily attained. The photopolymerizable polymer may have at least one kind of silicone group and/or fluorine-containing group. The (meth)acryloyl group in the photopolymerizable polymer is a group necessary to be involved in the polymerization of the (meth)acryl monomer impregnated into the rubber elastic body. The (meth)acryloyl group in the photopolymerizable polymer may be composed of either one or both of an acryloyl group and a methacryloyl group.

The photopolymerizable polymer can specifically be composed of a copolymer including a first polymerization unit; and/or a second polymerization unit; and a third polymerization unit. The first polymerization unit is derived from a (meth)acrylate having a silicone group in a molecule, the second polymerization unit is derived from a (meth) acrylate having a fluorine-containing group in a molecule, and the third polymerization unit is derived from a (meth) acrylate having an hydroxyl group in a molecule, in which the hydroxyl group is chemically modified with a molecule having a (meth)acryloyl group. In the meantime, the term "(meth)acrylate" means that it can include not only acrylates but also methacrylates. Also, the term "fluorine-containing group" refers to a group containing a fluorine atom, including —F.

In this case, the proportions of the silicone group in the first polymerization unit and/or the fluorine-containing group in the second polymerization unit and the (meth) acryloyl group in the molecule which chemically modifies the hydroxyl group of the third polymerization unit are easily controlled. Therefore, advantageously in this case, toner releasability and low friction property in the modified rubber elastic body in the electrophotographic device member are easily balanced.

The copolymer may be either a random copolymer or a block copolymer. Preferably, the copolymer is a random copolymer. In this case, the silicone group in the first polymerization unit and/or the fluorine-containing group in the second polymerization unit is/are easily made to be randomly present on the surface of the rubber elastic body. Therefore, this case advantageously contributes to the improvement in balance between powder releasability and low friction property in the modified rubber elastic body.

In the copolymer, the (meth)acrylate having a silicone group in its molecule can have at least one kind of silicone groups. Examples of the silicone group can include dimethyl silicone groups, diethyl silicone groups and diphenyl silicone groups. Specifically, a polydimethylsiloxane skeleton formed by repetition of a dimethylsiloxane unit etc. can be included as the silicone group. In this case, the molecular weight of the silicone group can be increased by the polydimethylsiloxane skeleton having a relatively simple molecular structure, which easily contributes to the reduction in friction on the modified rubber elastic body surface.

In the copolymer, the (meth)acrylate having a fluorine-containing group in its molecule can have at least one kind of fluorine-containing groups. The fluorine-containing group can specifically be composed, for example, of a fluoroalkyl group, a fluoroalkylalkylene oxide group, a fluoroalkenyl group and —F.

Among these groups, a fluoroalkyl group (preferably having about 4 to 12 carbon atoms) can be suitably used as the fluorine-containing group from the viewpoint, for example, of the toner releasability and availability of the (meth)acrylate having a fluorine-containing group in its molecule. The fluoroalkyl group may be such that all the hydrogen atoms of the alkyl group are fluorinated (fully fluorinated) or may partially include a non-fluorinated site (partially fluorinated). Especially preferably, the fluoroalkyl group is a perfluoroalkyl group. The perfluoroalkyl group hardly to hold a toner in an attracted state because of its high structural stability, and thus is beneficial in improving toner releasability.

Specific examples of the fluoroalkyl group can include trifluoromethyl, trifluoroethyl, trifluorobutyl, pentafluoropropyl, perfluorobutyl, perfluorohexyl, perfluorooctyl, perfluorodecyl, perfluoro-3-methylbutyl, perfluoro-5-methylhexyl, perfluoro-7-methyloctyl, octafluoropentyl, dodecafluoroheptyl and hexadecafluorononyl.

In the modified rubber elastic body, the silicone group includes a polydimethylsiloxane skeleton formed by repetition of a dimethylsiloxane unit, and the fluorine-containing group is preferably a perfluoroalkyl group. In this case, a electrophotographic device member having a modified rubber elastic body excellent in attaining both toner releasability and low friction property is easily obtained.

In the copolymer, more specifically, the (meth)acrylate having a silicone group in its molecule may be defined as a compound represented by the following formula (3):

[Chemical Formula 1]

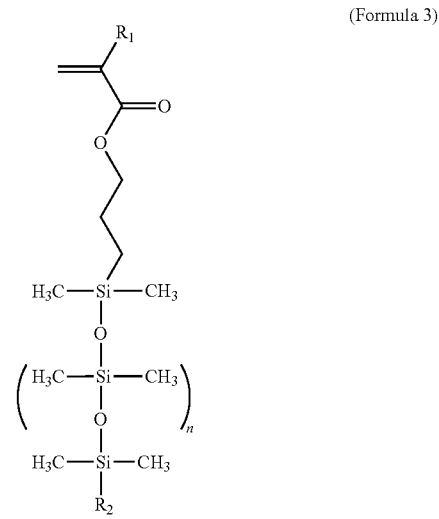

(Formula 3)

(wherein $R_1$ represents H or $CH_3$; n is an integer of 2 to 270; and $R_2$ represents $CH_3$ or $CH_3(CH_2)_3$.)

In the formula (3), from the viewpoint, for example, of the reactivity during synthesis and low friction property, n can be defined as an integer of preferably 3 or more, more preferably 4 or more, even more preferably 5 or more, and can also be defined as an integer of preferably 240 or less, more preferably 200 or less, even more preferably 160 or less.

In the copolymer, more preferably, the (meth)acrylate having a fluorine-containing group in its molecule may be defined as a compound represented by the following formula (4):

[Chemical Formula 2]

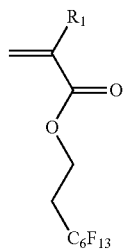

(Formula 4)

(wherein $R_1$ represents H or $CH_3$.)

The compounds represented by the formulae (3) and (4) are relatively easily available, and thus allow for relatively easy synthesis of the photopolymerizable polymer. Therefore, the electrophotographic device member having a modified rubber elastic body which provides the functions/effects is easily obtained in this case.

In the copolymer, specific examples of the (meth)acrylate having a hydroxyl group in its molecule, can include 2-hydroxyethyl methacrylate, hydroxyethyl(meth)acrylate, hydroxypropyl(meth)acrylate, hydroxybutyl(meth)acrylate, EO-modified (meth)acrylate and hydroxyethyl(meth)acrylamide. Among these (meth)acrylates, preferably, compounds more specifically represented by the following formulae (5) and (6) can be used from the viewpoint, for example, of easy introduction of the (meth)acroyl group after polymerization.

[Chemical Formula 3]

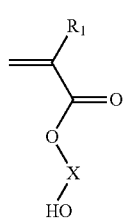

(Formula 5)

(wherein $R_1$ represents H or $CH_3$; and X represents an alkyl group, an aryl group or an aralkyl group.)

[Chemical Formula 4]

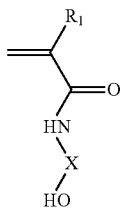

(Formula 6)

(wherein $R_1$ represents H or $CH_3$; and X represents an alkyl group, an aryl group or an aralkyl group.)

The hydroxyl group of the compounds represented by the formulae (5) and (6) can be chemically modified with a molecule having a (meth)acryloyl group with relative ease. In the meantime, the alkyl group in the formulae (5) and (6) can be a methyl group, an ethyl group, a propyl group, a butyl group or the like.

In the copolymer, specific examples of the molecule having a (meth)acryloyl group which chemically modifies the hydroxyl group of the third polymerization unit can include 2-isocyanatoethyl (meth)acrylate, acrylic acid and methacrylic acid. Among these molecules, preferably, 2-isocyanatoethyl (meth)acrylate is suitable from the viewpoint, for example, of the reactivity with the compound represented by the formula (3). In the copolymer, a specific example of the molecule having a (meth)acryloyl group which chemically modifies the hydroxyl group of the third polymerization unit can be a compound represented by the following formula (7):

[Chemical Formula 5]

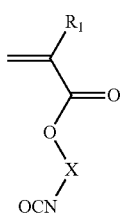

(Formula 7)

(wherein $R_1$ represents H or $CH_3$; and X represents an alkyl group, an aryl group or an aralkyl group.)

The compound represented by the formula (7) has an isocyanate group, and thus can advantageously be reacted with a hydroxyl group at a relatively low temperature for a relatively short time. In the meantime, the alkyl group in the formula (7) can be a methyl group, an ethyl group, a propyl group, a butyl group or the like.

The photopolymerizable polymer can include 0 to 60 mol % of a first polymerization unit, 0 to 60 mol % of a second polymerization unit and 0.01 to 60 mol % of a third polymerization unit in the state where the hydroxyl group is chemically modified. However, since either one of the first and second polymerization units is essential, such a case where a total proportion of the first and second polymerization units is 0 mol %, i.e. the first and second polymerization units are simultaneously 0 mol %, is excluded. Also, the respective proportions of the first polymerization unit, the second polymerization unit and the third polymerization unit in the state where the hydroxyl group is chemically modified can be determined in such a manner that the total proportion of the polymerization units including other polymerization units which will be described later, if any, is 100 mol %.

In this case, both toner releasability and low friction property can be ensured in the modified rubber elastic body in the electrophotographic device member. Also, the proportions of the respective polymerization units of the photopolymerizable polymer are controlled within the above-described ranges to control the amounts of the silicone group and fluorine-containing group, thereby easily controlling the balance between the two properties.

The proportion of the first polymerization unit can be defined as preferably 0.01 mol % or more, more preferably 0.05 mol % or more, even more preferably 0.1 mol % or more, still even more preferably 0.3 mol % or more from the viewpoint, for example, of the improvement in low friction property. Also, the proportion of the first polymerization unit can be defined as preferably 50 mol % or less, more preferably 35 mol % or less, even more preferably 10 mol % or less from the viewpoint, for example, of the solubility of the photocurable composition in a solvent. The proportion of the second polymerization unit can be defined as preferably 0.1 mol % or more, more preferably 1 mol % or more, even more preferably 5 mol % or more, still even more preferably 10 mol % or more from the viewpoint, for example, of the improvement in toner releasability such as a toner. Also, the proportion of the second polymerization unit can be defined as preferably 50 mol % or less, more preferably 45 mol % or less, even more preferably 30 mol % or less from the viewpoint, for example, of the solubility of the photocurable composition in a solvent. The proportion of the third polymerization unit in the state where the hydroxyl group is chemically modified can be defined as preferably 1 mol % or more, more preferably 5 mol % or more, even more preferably 10 mol % or more from the viewpoint, for example, of the photoreactivity. Also, the proportion of the third polymerization unit in the state where the hydroxyl group is chemically modified can be defined as preferably 50 mol % or less, more preferably 45 mol % or less, even more preferably 30 mol % or less from the viewpoint, for example, of toner releasability and low friction property to be sufficiently developed by the first and second polymerization units. In the meantime, the proportions of the above-described polymerization units can be measured by pyrolysis GC/MS analysis, NMR analysis or the like.

The copolymer can include at least one kind of polymerization units derived from other (meth)acrylates, according to need, in addition to the polymerization units.

For example, the copolymer can further include a fourth polymerization unit derived from a (meth)acrylate having an alkyl group. In the meantime, the copolymer can include at least one kind of fourth polymerization units.

In this case, the fourth polymerization unit(s) can bring such an advantage to improve the solubility of the first to third polymerization units in the (meth)acryl monomer and/or solvent so as to uniformly modify the rubber elastic body, and the like.

The (meth)acrylate having an alkyl group can have at least one kind of alkyl groups. Specific examples of the alkyl group can include a methyl group, an ethyl group, a propyl group, a butyl group, a pentyl group and a hexyl group from the viewpoint, for example, of the solubility in the (meth)acryl monomer and/or solvent. Among these groups, the alkyl group is preferably a methyl group, an ethyl group, a propyl group, a butyl group or the like from the viewpoint, for example, of good reactivity with an acryl group or a methacryl group during synthesis.

More specifically, the (meth)acrylate having an alkyl group can be methyl methacrylate or butyl methacrylate.

In this case, the fourth polymerization unit is easily copolymerized with the first to third polymerization unit and also easily improve the compatibility between the (meth)acryl monomer and/or solvent and the photopolymerizable polymer, so that the above-described advantageous effects are easily obtained.

The proportion of the fourth polymerization unit can be defined as preferably 5 mol % or more, more preferably 10 mol % or more, even more preferably 30 mol % or more, still even more preferably 50 mol % or more from the viewpoint, for example, of the improvement in solubility in the (meth)acryl monomer and/or solvent. Also, the proportion of the fourth polymerization unit can be defined as preferably 95 mol % or less, more preferably 94 mol % or less, even more preferably 92 mol % or less, still even more preferably 90 mol % or less from the viewpoint, for example, of ensuring the proportions of the first to third polymerization units for development of the effects.

Also, the copolymer can further include a fifth polymerization unit derived from a (meth)acrylate having, in its molecule, a functional group other than the silicone group, fluorine-containing group, hydroxyl group and alkyl group.

In this case, the function due to the functional group can be imparted to the modified rubber elastic body, in addition to toner releasability and low friction property, so that the total function of the modified rubber elastic body in the electrophotographic device member can be further improved. The (meth)acrylate having, in its molecule, a functional group other than the silicone group, fluorine-containing group, hydroxyl group and alkyl group can include at least one kind of functional groups. Also, the copolymer can comprise one kind or at least two kinds of fifth polymerization units.

Specifically, at least one kind selected, for example, from ester groups, ether groups, amide groups, amino groups, quaternary ammonium salts, phosphonium salts, carboxylic acid groups, sulfonic acid groups and phenyl groups can be used as the above-described functional group.

For example, ester groups and ether groups, among the functional groups, have the effect of reducing electric resistance. Also, for example, amide groups, amino groups, quaternary ammonium salts, phosphonium salts, among the functional groups, can impart chargeability to the modified rubber elastic body. Therefore, in this case, the modified rubber elastic body can have, for example, toner chargeability to negatively charged toners. Also, among the functional groups, carboxylic acid groups and sulfonic acid groups can impart chargeability. Therefore, in this case, the modified rubber elastic body can have, for example, toner chargeability to positively charged toners.

The photopolymerizable polymer can be, more specifically, composed of at least one kind selected from polymers having molecular structures represented by the following formulae (1) and (2):

[Chemical Formula 6]

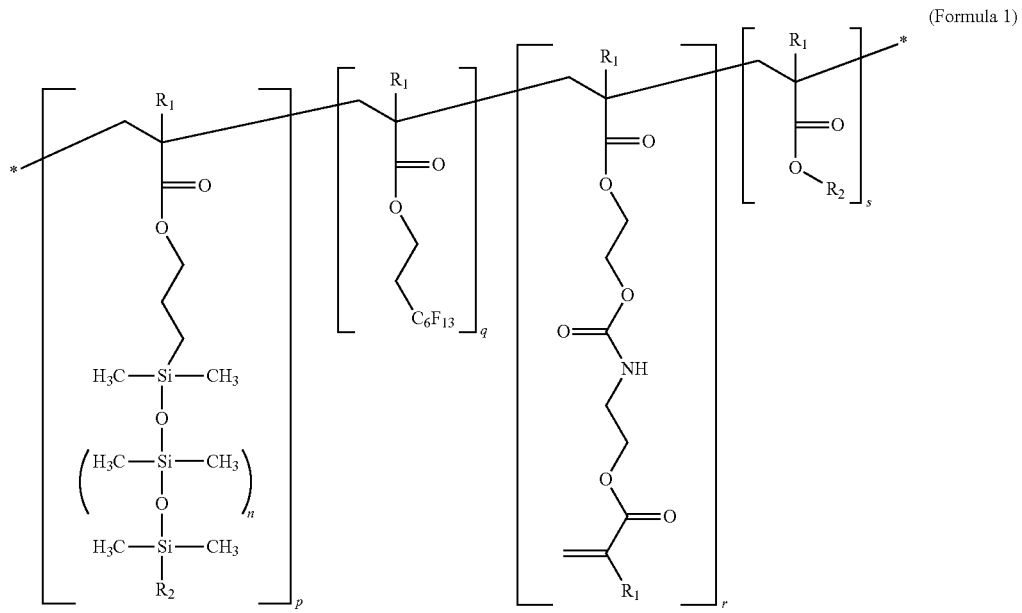

(Formula 1)

(wherein $R_1$ represents H or $CH_3$; $R_2$ represents an alkyl group; p ranges from 0 to 60, q ranges from 0 to 60, r ranges from 0.01 to 60, s ranges from 0 to 95 by mol %, provided that p+q≠0; and n is an integer of 2 to 270)

[Chemical Formula 7]

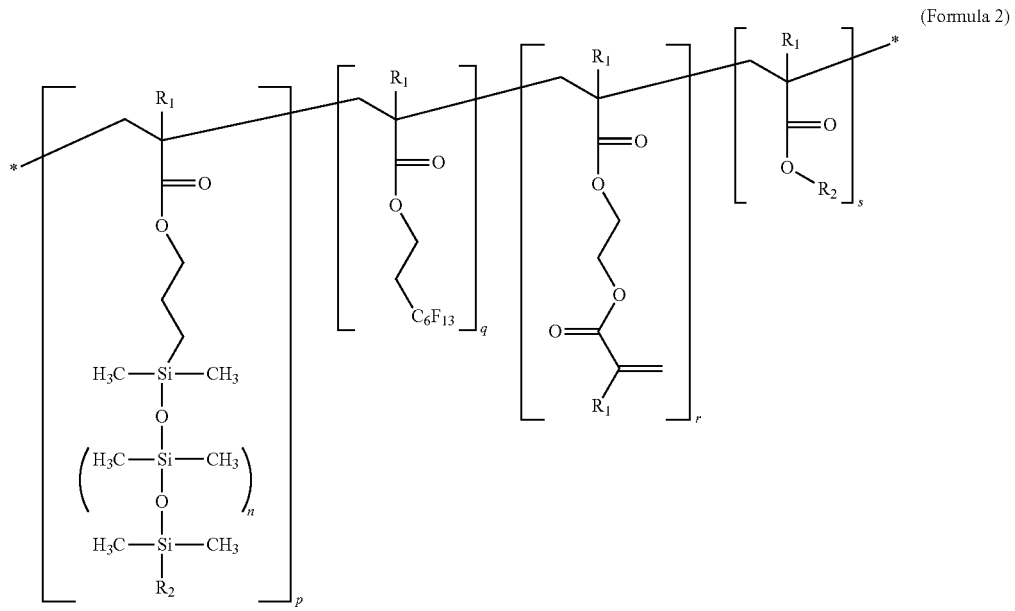

(Formula 2)

(wherein $R_1$ represents H or $CH_3$; $R_2$ represents an alkyl group; p ranges from 0 to 60, q ranges from 0 to 60, r ranges from 0.01 to 60, s ranges from 0 to 95 by mol %, provided that p+q≠0; and n is an integer of 2 to 270.)

The alkyl group as $R_2$ in the formulae (1) and (2) can preferably be a methyl group, an ethyl group, a propyl group or a butyl group. For the above-described reason, p can be defined as preferably 0.01 or more, more preferably 0.05 or more, even more preferably 0.1 or more, still even more preferably 0.3 or more by mol %; and p can be defined as preferably 50 or less, more preferably 35 or less, even more preferably 10 or less by mol %. Also, q can be defined as preferably 0.1 or more, more preferably 1 or more, even more preferably 5 or more, still even more preferably 10 or more by mol %; and q can be defined as preferably 50 or less, more preferably 45 or less, even more preferably 30 or less by mol %. Also, r can be defined as preferably 1 or more, more preferably 5 or more, even more preferably 10 or more by mol %; and r can be defined as preferably 50 or less, more preferably 45 or less, even more preferably 30 or less by mol %. Also, s can be defined as preferably 5 or more, more preferably 10 or more, even more preferably 30 or more, still even more preferably 50 or more by mol %; and s can be defined as preferably 95 or less, more preferably 94 or less, even more preferably 92 or less, still even more preferably 90 or less by mol %. Also, n can be defined as preferably 3 or more, more preferably 4 or more, even more preferably 5 or more; and n can be defined as preferably 240 or less, more preferably 200 or less, even more preferably 160 or less. In the meantime, the proportions of the respective polymerization units, p, q, r and s, are 100 mol % in total.

In the photocurable composition, for example, a radical photopolymerization initiator which generates radicals upon light irradiation with ultraviolet rays, electron beams or the like, a cationic photopolymerization initiator which generates cations upon light irradiation with ultraviolet rays, electron beams or the like and an anionic photopolymerization initiator which generates anions upon light irradiation with ultraviolet rays, electron beams or the like can be suitably used as the photopolymerization initiator. Among these, the radical photopolymerization initiator can be especially suitably used. This is because many of (meth)acryloyl groups are apt to cause a radical polymerization reaction. In the meantime, the modified rubber elastic body may be such that a part of the photopolymerization initiator is chemically bound to the surface-treated layer and/or rubber elastic body.

Specific examples of the radical photopolymerization initiator include acetophenone, p-anisyl, benzyl, benzoin, benzoin ethyl ether, benzoin isobutyl ether, benzoin isopropyl ether, benzoin methyl ether, benzophenone, 2-benzoyl benzoate, 4-benzoyl benzoate, 4,4'-bis(diethylamino)benzophenone, 4,4'-bis(dimethylamino)benzophenone, 4,4'-dichlorobenzophenone, 2,2-diethoxyacetophenone, 2,4-diethylthioxaneten-9-one, 2,2-dimethoxy-2-phenylacetophenone, diphenyl(2,4,6-trimethylbenzoyl)phosphine oxide, 2-ethylanthraquinone, 1-hydroxycyclohexylphenylketone, 2-hydroxy-2-methylpropiophenone, 2-isonitrosopropiophenone, methyl 2-benzoyl benzoate, 2-methyl-4'-(methylthio)-2-morpholinopropiophenone and 2-phenyl-2-(p-toluenesulfonyloxy)acetophenone. These radical photopolymerization initiators can be used singly, or at least two kinds thereof can be used in combination.

Specific examples of the cationic photopolymerization initiator include bis(4-tert-butylphenyl)iodonium hexafluorophosphate, bis(4-tert-butylphenyl)iodonium trifluoromethanesulfonate, 2-(3,4-dimethoxystyryl)-4,6-bis(trichloromethyl)-1,3,5-triazine, diphenyliodonium hexafluoroarsenate, diphenyliodonium hexafluorophosphate, diphenyliodonium trifluoromethanesulfonic acid, 2-[2-(furan-2-yl)vinyl]-4,6-bis(trichloromethyl)-1,3,5-triazine, 4-isopropyl-4'-methyldiphenyliodoniumtetrakis(pentafluorophenyl)borate, 2-(4-methoxyphenyl)-4,6-bis(trichloromethyl)-1,3,5-triazine, 2-[2-(5-methylfuran-2-yl)vinyl]-4,6-bis(trichloromethyl)-1,3,5-triazine, triphenylsulfonium tetrafluoroborate, tri-p-tolylsulfonium hexafluorophosphate and tri-p-tolylsulfonium trifluoromethanesulfonate. These cationic photopolymerization initiators can be used singly, or at least two kinds thereof can be used in combination.

One specific example of the anionic photopolymerization initiator is nifedipine.

The photopolymerizable composition contains a (meth) acryl monomer, and thus can sometimes be a liquid having relatively low viscosity. Therefore, a solvent does not necessarily have to be contained in the composition. In fact, according to need, the photocurable composition can contain a solvent in order to, for example, adjust the viscosity to a level suitable for coating onto the rubber elastic body. Examples of the solvent include organic solvents such as ether-based solvents (for example, THF, diethylether and dioxane), ester-based solvents (for example, ethyl acetate and butyl acetate), ketone-based solvents (for example, acetone and MEK), amide-based solvents (for example, DMF, DAC and NMP), tertiary alcohols (for example, tert-butyl alcohol) and hydrocarbon-based solvents (for example, toluene, xylene and hexane); and water. These solvents can be used singly, or at least two kinds thereof can be used in combination.

The photocurable composition can include at least one kind of additives including a catalyst such as an acid, a base and a metal salt, a surfactant and a curing aid which thermally reacts with a (meth)acrylate such as polyfunctional thiol.

The photocurable composition can be configured so as to include 0.01 to 10 parts by mass of a photopolymerizable polymer based on 100 parts by mass of the (meth)acryl monomer.

The content of the photopolymerizable polymer can be defined as preferably 0.1 parts by mass or more, more preferably 0.5 parts by mass or more, even more preferably 1 part by mass or more from the viewpoint, for example, of obtaining sufficient effects by addition. Also, the content of the photopolymerizable polymer can be defined as preferably 10 parts by mass or less, more preferably 7 parts by mass or less, even more preferably 5 parts by mass or less from the viewpoint, for example, of suppression of uneven modification. In the meantime, the content of the photopolymerizable polymer can be measured by pyrolysis GC/MS analysis, NMR analysis or the like.

The photocurable composition can be configured so as to include 0.01 to 10 parts by mass of a photopolymerizable polymer based on 100 parts by mass of the (meth)acryl monomer.

The content of the photopolymerization initiator can be defined as preferably 0.1 parts by mass or more, more preferably 0.5 parts by mass or more, even more preferably 1 part by mass or more from the viewpoint, for example, of ensuring sufficient photocurability. Also, the content of the photopolymerizable polymer can be defined as preferably 10 parts by mass or less, more preferably 7 parts by mass or less, even more preferably 5 parts by mass or less from the viewpoint, for example, of suppressing of remaining of decomposed products.

The photocurable composition can be configured as a cured product cured upon light irradiation with ultraviolet rays, electron beams or the like.

In the modified rubber elastic body, the surface-treated layer can be configured to have a number of the silicone groups and/or the fluorine-containing groups on its surface side.

In this case, the silicone groups and/or fluorine-containing groups are present more on the surface side than inward of the surface treated layer, and thus the toner releasability and low friction property on the surface of the modified rubber elastic body in the electrophotographic device member can be reliably ensured.

As one example of a method for forming the modified rubber elastic body in the electrophotographic device member, there is provided a method including a step of impregnating the rubber elastic body with a liquid photocurable composition composed of a (meth)acryl monomer, a photopolymerizable polymer having a silicone group and/or a fluorine-containing group and a (meth)acryloyl group in its molecule, and a photopolymerization initiator from the surface of a rubber elastic body, and a step of applying light irradiation to the surface of the rubber elastic body which has undergone the impregnation step to cure the photocurable composition, thereby forming a surface-treated layer. In the meantime, the photopolymerizable polymer can be prepared, for example, by the following processes. In this method, the above-described compounds for forming a first polymerization unit and/or a second polymerization unit and a third polymerization unit and, according to need, polymerization units such as a fourth polymerization unit and a fifth polymerization unit are copolymerized to obtain a copolymer, and the hydroxyl group in the third polymerization unit in the resultant copolymer is chemically modified with a molecule having a (meth)acryloyl group such as isocyanatoalkyl (meth)acrylate.

In the impregnation step, the method for impregnating the photocurable composition into the rubber elastic body from the surface is not specifically limited, and various methods can be employed. Examples of the method can include a method of immersing the rubber elastic body in a liquid photocurable composition and a method of coating the surface of the rubber elastic body with a liquid photocurable composition by using various coating methods.

The temperature in the impregnation of the photocurable composition can be about normal temperature. Also, the light irradiation can be ultraviolet irradiation from the viewpoint, for example, of the effects attained by a relatively simple device. The method for forming the modified rubber elastic body in the electrophotographic device member can also include, according to need, a step of washing the surface of the rubber elastic body, after the curing step. In this case, uncured components can be washed off, so that treatment unevenness can be reduced. In the meantime, water, an organic solvent and a mixture thereof can be used.

Specific examples of the electrophotographic device in which the electrophotographic device member is incorporated include image forming devices such as copiers, printers, facsimiles, combined machines and POD (Print On Demand) which employ an electrophotographic system using charged images.

The electrophotographic device member is usually used in the state to contact the surface with other counterpart members in the electrophotographic device (for example, a photoreceptor and a blade member, a roll member and the like arranged around the electrophotographic device member) in the presence of a toner. The electrophotographic device member having the modified rubber elastic body on its surface is excellent in toner releasability of the surface, so that the toner adhered to the surface is released therefrom and hardly remains on the surface. Also, the electrophotographic device member having the modified rubber elastic body on its surface is excellent in low friction property of the surface, so that the sliding between the electrophotographic device member and the counterpart members can be stabilized. Therefore, the electrophotographic device member having the modified rubber elastic body on its surface can contribute to good image formation.

Specific examples of the electrophotographic device member can include a developing member, a charging member, a transferring member and a cleaning member to be incorporated in the electrophotographic image forming device.

The developing member, charging member, transferring member and cleaning member are often used in contact with the counterpart members. Thus, they can sufficiently exert the above-described effects.

In the meantime, the developing member and charging member can be configured as a roll member having an axis body and the modified rubber elastic body layered on the outer periphery of the axis body. As one specific example of the transferring member, there is provided with an intermediate transferring member. In the intermediate transferring member, a toner image supported on a photoreceptor is subjected to primary transfer to the intermediate transferring member and thereafter is subjected to secondary transfer from the intermediate transferring member to a transfer material such as a paper. The transferring member can be configured as a belt member having a base layer composed, for example, of a cylindrically-formed resin and the modified rubber elastic bodies, in a layered shape, formed along the outer peripheral surface of this base layer. Also, the cleaning member can be configured as a blade member having a blade part formed from the modified rubber elastic body in a planar shape and a holding part which holds the blade part or as a roll member having an axis body and the modified rubber elastic bodies layered on the outer periphery of the axis body.

EXAMPLES

Samples to which the above-described modified rubber elastic body was applied and comparative samples were prepared and evaluated as materials for a portion including the surface of an electrophotographic device member used in an electrophotographic image forming device. Hereinafter, an experimental example of these samples will be explained.

Figure 2:
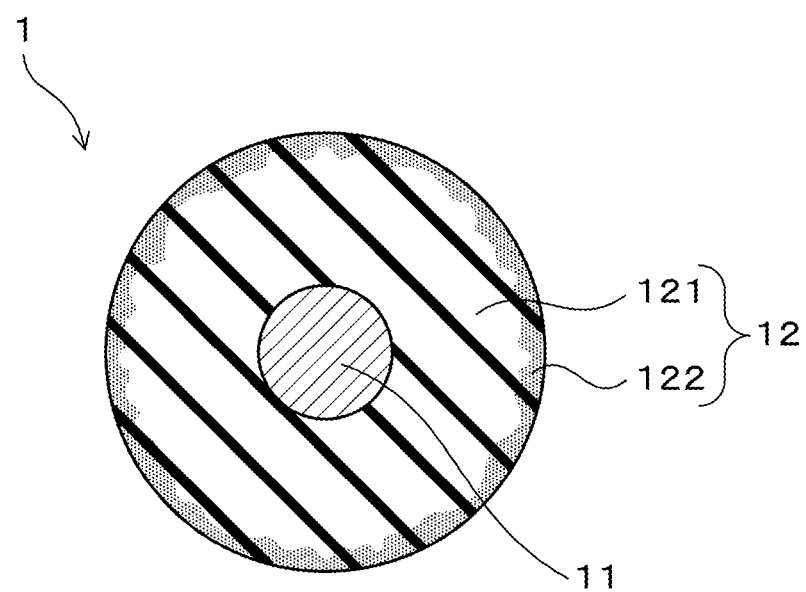
FIG. 2 is a view schematically showing the II-II cross section in FIG. 1.
Figure 3:
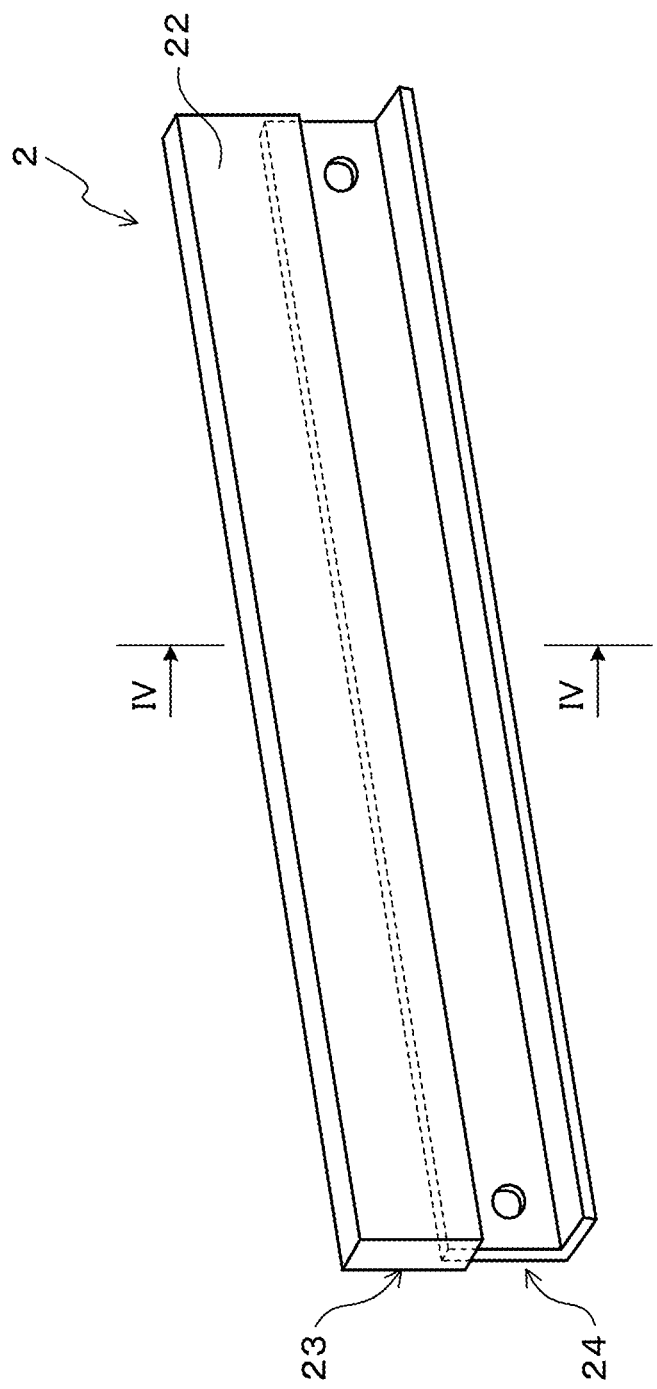
FIG. 3 is a view schematically showing a blade member as an electrophotographic device member in an Example to which a modified rubber elastic body is applied.
Figure 4:
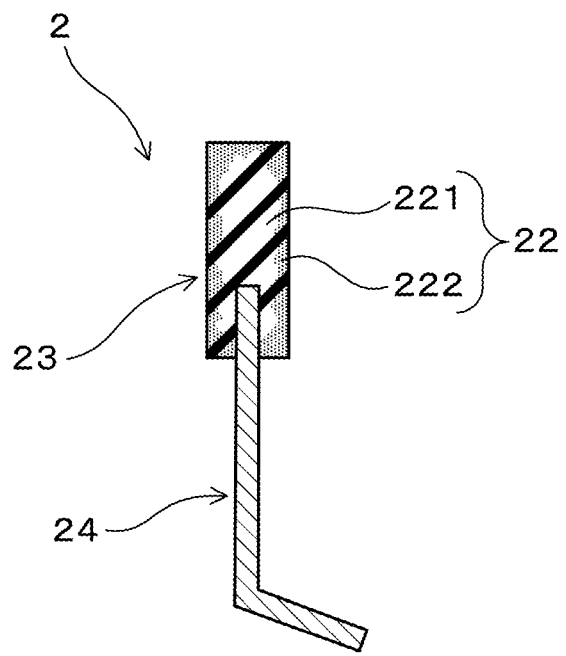
FIG. 4 is a view schematically showing the IV-IV cross section in FIG. 3.
Figure 5:
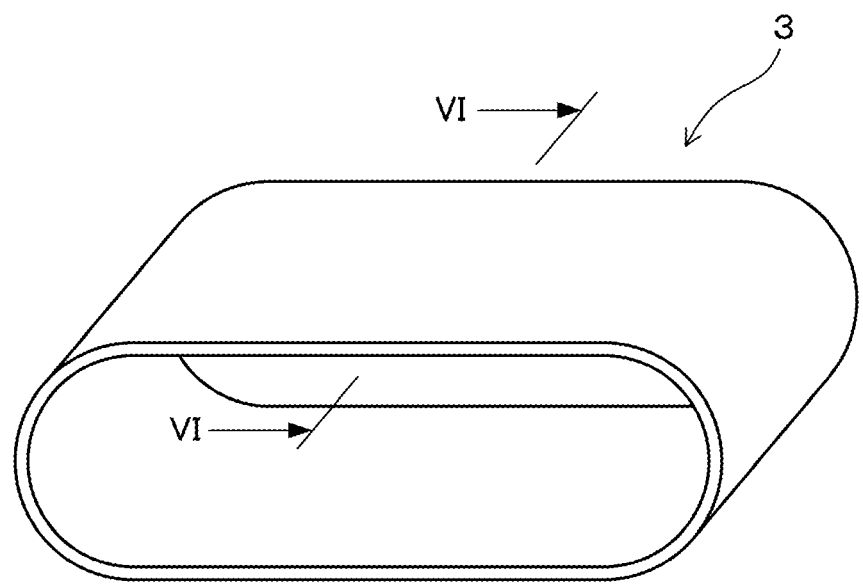
FIG. 5 is a view schematically showing a belt member as an electrophotographic device member in an Example to which a modified rubber elastic body is applied.
Figure 6:
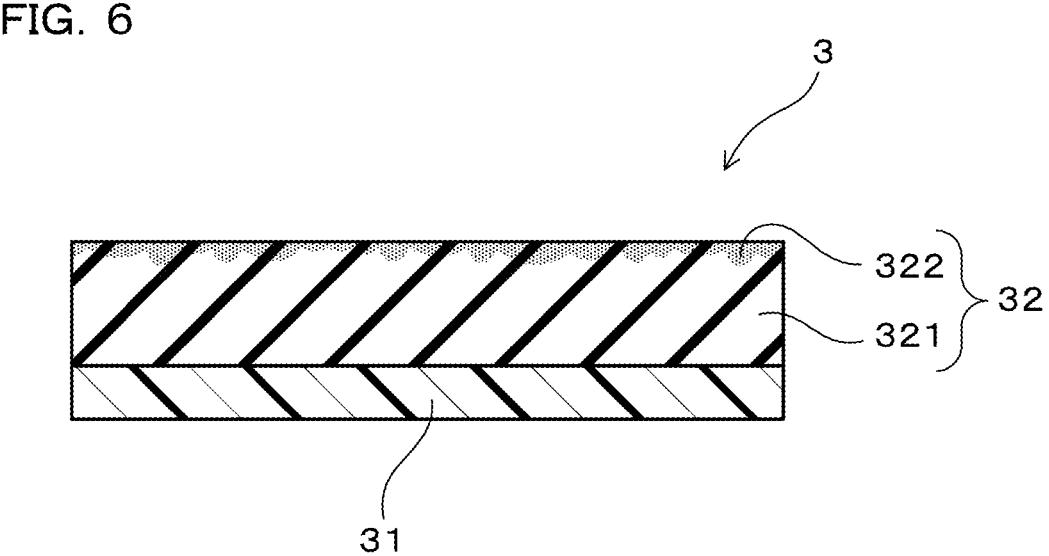
FIG. 6 is a view schematically showing the VI-VI cross section in FIG. 5.

In this experimental example, the electrophotographic device member is specifically a roll member or a blade member. Specifically, among the samples of electrophotographic device member to which the modified rubber elastic body was applied, a roll member 1 has an axis body 11 and a layered modified rubber elastic body 12 formed along the outer periphery of the axis body 11, as shown in FIGS. 1 and 2. The modified rubber elastic body 12 has a rubber elastic body 121 with rubber elasticity and a surface-treated layer 122 composed of a cured product of photocurable composition impregnated into the rubber elastic body 121 from the surface thereof. Also, among the samples to which the modified rubber elastic body was applied, a blade member 2 has a blade part 23 formed from a planar modified rubber elastic body 22 and a holding member 24 which holds the blade part 23, as shown in FIGS. 3 and 4. The modified rubber elastic body 22 has a rubber elastic body 221 with rubber elasticity and a surface-treated layer 222 composed of a cured product of photocurable composition impregnated into the rubber elastic body 221 from the surface thereof. That is, the surfaces of the modified rubber elastic bodies 12, 22 are exposed to the outside, and constitute the outermost surfaces of the respective members. In this example, the rubber elastic body 121 of the roll member 1 contains a conducting agent, and thus has electric conductivity.

Both the surface-treated layers 122, 222 in the modified rubber elastic bodies 12, 22 are composed of a cured product of photocurable composition including a (meth)acryl monomer, a photopolymerizable polymer having a silicone group and/or a fluorine-containing group and a (meth)acryloyl group in its molecule, and a photopolymerization initiator.

In the meantime, the electrophotographic device member can also be configured as a belt member although no specific sample has been prepared in this example. In this case, the belt member 3 can be configured so as to have a base layer 31 formed of a cylindrically-formed resin and a layered modified rubber elastic body 32 formed along the outer peripheral surface of this base layer 31. The modified rubber elastic body 32 has a rubber elastic body 321 with rubber elasticity and a surface-treated layer 322 composed of a cured product of photocurable composition impregnated into the rubber elastic body 321 from the surface thereof, and the surface-treated layer 322 can be configured in a similar manner as above. Also, the base layer 31 and rubber elastic body 321 of the belt member 3 can be configured so as to contain a conducting agent and therefore to have electric conductivity.

Experimental Example

Preparation of Photopolymerizable Polymer

Photopolymerizable polymers to be incorporated in the photocurable composition and comparative polymers were prepared as follows.

Photopolymerizable Polymer A

In a 100-mL reaction flask, 1.66 g (0.36 mmol) of acrylate-modified silicone oil (manufactured by Shin-Etsu Chemical Co., Ltd; "X-22-174DX"), 5.61 g (13 mmol) of 2-(perfluorohexyl)ethyl acrylate (manufactured by Daikin Industries, Ltd.; "R-1620"), 1.69 g (13 mmol) of 2-hydroxyethyl methacrylate (Tokyo Chemical Industry Co., Ltd.), 7.37 g (73.64 mmol) of methyl methacrylate (manufactured by Junsei Chemical Co., Ltd.), 1.24 g (4 mmol) of dimethyl 1,1'-azobis(1-cyclohexanecarboxylate) (Wako Chemical Industries, Ltd.; "VE-73") and 75 g of methyl ethyl ketone (MEK) were charged, and bubbled with nitrogen while being stirred for 5 minutes, and thereafter polymerized at an internal liquid temperature of 75° C. for 7 hours to produce a copolymer.

In the meantime, the acrylate-modified silicone oil is a compound represented by the formula (3), wherein $R_1$ is $CH_3$; $R_2$ is $CH_3$ $(CH_2)_3$; and n is 60. That is, the silicone group includes a polydimethylsiloxane skeleton formed by repetition of a dimethylsiloxane unit.

Thereafter, 2.02 g (13 mmol) of 2-isocyanatoethyl methacrylate (manufactured by SHOWA DENKO K.K.; "KarenzMOI") and 0.001 g of bismuth tris(2-ethylhexanoate) were added to this reaction flask, and then the mixture was stirred at an internal liquid temperature of 75° C. for 10 hours to react the hydroxyl group in the polymerization unit derived from 2-hydroxyethyl methacrylate in the copolymer with the isocyanate group in the 2-isocyanatoethyl methacrylate, thereby obtaining a synthetic liquid A containing a photopolymerizable polymer A.

The photopolymerizable polymer A is composed of a linear copolymer including a first polymerization unit derived from a (meth)acrylate having a silicone group in a molecule, a second polymerization unit derived from a (meth)acrylate having a fluorine-containing group in a molecule, a third polymerization unit derived from a (meth)acrylate having a hydroxyl group in a molecule, and a fourth polymerization unit derived from a (meth)acrylate having an alkyl group. The hydroxyl group is chemically modified with a molecule having a (meth)acryloyl group. More specifically, the photopolymerizable polymer A is a compound having a molecular structure represented by Formula (1) (wherein $R_1$ represents a methyl group; $R_2$ represents a methyl group; and, by mol %, p=0.4, q=13, r=13 and s=73.6).

Photopolymerizable Polymer B

In a 100-mL reaction flask, 1.66 g (0.36 mmol) of the acrylate-modified silicone oil, 1.69 g (13 mmol) of the 2-hydroxyethyl methacrylate, 8.67 g (86.64 mmol) of the methyl methacrylate, 1.24 g (4 mmol) of the dimethyl 1,1'-azobis(1-cyclohexanecarboxylate) and 65 g of methyl ethyl ketone (MEK) were charged, and bubbled with nitrogen while being stirred for 5 minutes, and thereafter polymerized at an internal liquid temperature of 75° C. for 7 hours to produce a copolymer.

Thereafter, 2.02 g (13 mmol) of the 2-isocyanatoethyl methacrylate and 0.001 g of bismuth tris(2-ethylhexanoate) were added to this reaction flask, and then the mixture was stirred at an internal liquid temperature of 75° C. for 10 hours to react the hydroxyl group in the polymerization unit derived from 2-hydroxyethyl methacrylate in the copolymer with the isocyanate group in the 2-isocyanatoethyl methacrylate, thereby obtaining a synthetic liquid B containing a photopolymerizable polymer B.

The photopolymerizable polymer B is composed of a linear copolymer including a first polymerization unit derived from a (meth)acrylate having a silicone group in a molecule, a third polymerization unit derived from a (meth)acrylate having a hydroxyl group in a molecule, and a fourth polymerization unit derived from a (meth)acrylate having an alkyl group. The hydroxyl group is chemically modified with a molecule having a (meth)acryloyl group. More specifically, the photopolymerizable polymer B is a compound having a molecular structure represented by Formula (1) (wherein $R_1$ represents a methyl group; $R_2$ represents a methyl group; and, by mol %, p=0.4, q=0, r=13 and s=86.6).

Photopolymerizable Polymer C

In a 100-mL reaction flask, 5.61 g (13 mmol) of the 2-(perfluorohexyl)ethyl acrylate, 1.69 g (13 mmol) of the 2-hydroxyethyl methacrylate, 7.41 g (74 mmol) of the methyl methacrylate, 1.24 g (4 mmol) of the above-described dimethyl 1,1'-azobis(1-cyclohexanecarboxylate) and 72 g of methyl ethyl ketone (MEK) were charged, and bubbled with nitrogen while being stirred for 5 minutes, and thereafter polymerized at an internal liquid temperature of 75° C. for 7 hours to produce a copolymer.

Thereafter, 2.02 g (13 mmol) of the 2-isocyanatoethyl methacrylate and 0.001 g of bismuth tris(2-ethylhexanoate) were added to this reaction flask, and then stirred at an internal liquid temperature of 75° C. for 10 hours to react the hydroxyl group in the polymerization unit derived from 2-hydroxyethyl methacrylate in the copolymer with the isocyanate group in the 2-isocyanatoethyl methacrylate, thereby obtaining a synthetic liquid C containing a photopolymerizable polymer C.

The photopolymerizable polymer C is composed of a linear copolymer including a second polymerization unit derived from a (meth)acrylate having a fluorine-containing group in a molecule, a third polymerization unit derived from a (meth)acrylate having a hydroxyl group in a molecule, and a fourth polymerization unit derived from a (meth)acrylate having an alkyl group. The hydroxyl group is chemically modified with a molecule having a (meth)acryloyl group. More specifically, the photopolymerizable polymer C is a compound having a molecular structure represented by Formula (1) (wherein $R_1$ represents a methyl group; $R_2$ represents a methyl group; and, by mol %, p=0, q=13, r=13 and s=74).

Photopolymerizable Polymer D

In a 100-mL reaction flask, 1.66 g (0.36 mmol) of the acrylate-modified silicone oil; 5.61 g (13 mmol) of the 2-(perfluorohexyl)ethyl acrylate, 1.69 g (13 mmol) of the 2-hydroxyethyl methacrylate, 9.44 g (73.64 mmol) of butyl methacrylate (manufactured by Tokyo Chemical Industry Co., Ltd.), 1.24 g (4 mmol) of the dimethyl 1,1'-azobis(1-cyclohexanecarboxylate) and 87 g of methyl ethyl ketone (MEK) were charged, and bubbled with nitrogen while being stirred for 5 minutes, and thereafter polymerized at an internal liquid temperature of 75° C. for 7 hours to produce a copolymer.

Thereafter, 2.02 g (13 mmol) of the 2-isocyanatoethyl methacrylate and 0.001 g of bismuth tris(2-ethylhexanoate) were added to this reaction flask, and then stirred at an internal liquid temperature of 75° C. for 10 hours to react the hydroxyl group in the polymerization unit derived from 2-hydroxyethyl methacrylate in the copolymer with the isocyanate group in the 2-isocyanatoethyl methacrylate, thereby obtaining a synthetic liquid D containing a photopolymerizable polymer D.

The photopolymerizable polymer D is composed of a linear copolymer including a first polymerization unit derived from a (meth)acrylate having a silicone group in a molecule, a second polymerization unit derived from a (meth)acrylate having a fluorine-containing group in a molecule, a third polymerization unit derived from a (meth)acrylate having a hydroxyl group in a molecule, and a fourth polymerization unit derived from a (meth)acrylate having an alkyl group. The hydroxyl group is chemically modified with a molecule having a (meth)acryloyl group. More specifically, the photopolymerizable polymer D is a compound having a molecular structure represented by Formula (1) (wherein $R_1$ represents a methyl group; $R_2$ represents a butyl group; and, by mol %, p=0.4, q=13, r=13 and s=73.6).

Photopolymerizable Polymer E

In a 100-mL reaction flask, 1.69 g (13 mmol) of the 2-hydroxyethyl methacrylate, 8.71 g (87 mmol) of the methyl methacrylate, 1.24 g (4 mmol) of the above-described dimethyl 1,1'-azobis(1-cyclohexanecarboxylate) and 55 g of methyl ethyl ketone (MEK) were charged, and bubbled with nitrogen while being stirred for 5 minutes, and thereafter polymerized at an internal liquid temperature of 75° C. for 7 hours to produce a copolymer.

Thereafter, 2.02 g (13 mmol) of the 2-isocyanatoethyl methacrylate and 0.001 g of bismuth tris(2-ethylhexanoate) were added to this reaction flask, and then stirred at an internal liquid temperature of 75° C. for 10 hours to react the hydroxyl group in the polymerization unit derived from 2-hydroxyethyl methacrylate in the copolymer with the isocyanate group in the 2-isocyanatoethyl methacrylate, thereby obtaining a synthetic liquid E containing a photopolymerizable polymer E.

The photopolymerizable polymer E is composed of a linear copolymer including a third polymerization unit derived from a (meth)acrylate having a hydroxyl group in a molecule and a fourth polymerization unit derived from a (meth)acrylate having an alkyl group. The hydroxyl group is chemically modified with a molecule having a (meth)acryloyl group. The photopolymerizable polymer E is different from the photopolymerizable polymer A in that the polymer E contains neither the first polymerization unit nor the second polymerization unit.

Polymer F

In a 100-mL reaction flask, 1.66 g (0.36 mmol) of the acrylate-modified silicone oil, 5.61 g (13 mmol) of the 2-(perfluorohexyl)ethyl acrylate; 1.69 g (13 mmol) of the 2-hydroxyethyl methacrylate, 7.37 g (73.64 mmol) of the methyl methacrylate, 1.24 g (4 mmol) of the dimethyl 1,1'-azobis(1-cyclohexanecarboxylate) and 70 g of methyl ethyl ketone (MEK) were charged, and bubbled with nitrogen while being stirred for 5 minutes, and thereafter polymerized at an internal liquid temperature of 75° C. for 7 hours to produce a copolymer, thereby obtaining a synthetic liquid F containing a polymer F.

The polymer F is composed of a linear copolymer including a first polymerization unit derived from a (meth)acrylate having a silicone group in a molecule and a second polymerization unit derived from a (meth)acrylate having a fluorine-containing group in a molecule, a third polymerization unit derived from a (meth)acrylate having a hydroxyl group in a molecule, and a fourth polymerization unit derived from a (meth)acrylate having an alkyl group. The polymer F is different from the photopolymerizable polymer A in that the hydroxyl group is not chemically modified with a molecule having a (meth)acryloyl group, and that a (meth)acryloyl group is not contained in its molecule.

Polymer G

In a 100-mL reaction flask, 1.66 g (0.36 mmol) of the acrylate-modified silicone oil, 5.61 g (13 mmol) of the 2-(perfluorohexyl)ethyl acrylate, 8.67 g (86.64 mmol) of the methyl methacrylate, 1.24 g (4 mmol) of the dimethyl 1,1'-azobis(1-cyclohexanecarboxylate) and 70 g of methyl ethyl ketone (MEK) were charged, and bubbled with nitrogen while being stirred for 5 minutes, and thereafter polymerized at an internal liquid temperature of 75° C. for 7 hours to produce a copolymer, thereby obtaining a synthetic liquid G containing a polymer G.

The polymer G is composed of a linear copolymer including a first polymerization unit derived from a (meth)acrylate having a silicone group in a molecule, and a second polymerization unit derived from a (meth)acrylate having a fluorine-containing group in a molecule, and a fourth polymerization unit derived from a (meth)acrylate having an alkyl group. The polymer G is different from the photopolymerizable polymer A in that the polymer G does not contain a (meth)acryloyl group in its molecule.

TABLE 1

| | | Photopolymerizable polymer | | | | | Polymer | |
|---|---|---|---|---|---|---|---|---|
| | | A | B | C | D | E | F | G |
| Compounds used in synthesis of polymers | (First polymerization unit) Acrylate-modified silicone oil | 1.66 g (0.36 mmol) | 1.66 g (0.36 mmol) | — | 1.66 g (0.36 mmol) | — | 1.66 g (0.36 mmol) | 1.66 g (0.36 mmol) |
| | (Second polymerization unit) 2-(perfluorohexyl) ethyl acrylate | 5.61 g (13 mmol) | — | 5.61 g (13 mmol) | 5.61 g (13 mmol) | — | 5.61 g (13 mmol) | 5.61 g (13 mmol) |
| | (Third polymerization unit) | 1.69 g (13 mmol) | 1.69 g (13 mmol) | 1.69 g (13 mmol) | 1.69 g (13 mmol) | 1.69 g (13 mmol) | 1.69 g (13 mmol) | — |

TABLE 1-continued

| | Photopolymerizable polymer | | | | | Polymer | |
|---|---|---|---|---|---|---|---|
| | A | B | C | D | E | F | G |
| 2-hydroxyethyl methacrylate (Fourth polymerization unit) | 7.37 g (73.64 mmol) | 8.67 g (86.64 mmol) | 7.41 g (74 mmol) | — | 8.71 g (87 mmol) | 7.37 g (73.64 mmol) | 8.67 g (86.64 mmol) |
| Methyl methacrylate | | | | | | | |
| Butyl methacrylate | — | — | — | 9.44 g (73.64 mmol) | — | — | — |
| (Molecule for modifying hydroxyl group in the third polymerization unit) 2-isocyanatoethyl methacrylate | 2.02 g (13 mmol) | 2.02 g (13 mmol) | 2.02 g (13 mmol) | 2.02 g (13 mmol) | 2.02 g (13 mmol) | — | — |
| (Polymerization initiator) Dimethyl 1,1'-azobis(1-cyclohexane carboxylate) | 1.24 g (4 mmol) | 1.24 g (4 mmol) | 1.24 g (4 mmol) | 1.24 g (4 mmol) | 1.24 g (4 mmol) | 1.24 g (4 mmol) | 1.24 g (4 mmol) |

<Preparation of Photocurable Composition>

Prepared were pentaerythritol triacrylate (manufactured by TOAGOSEI CO., LTD.; "ARONIX M305") as a (meth)acryl monomer, and a radical photopolymerization initiator, 2-hydroxy-2-methyl-1-phenyl-propan-1-one (manufactured by Ciba Specialty Chemicals Inc.; "DAROCUR 1173") as a photopolymerization initiator.

Then, the respective materials were charged in the blending proportions (parts by mass) as shown in Table 2, and mixed by means of a stirrer at room temperature for 10 minutes, thereby preparing photocurable compositions 1 to 10 having the solid contents as shown in Table 2.

Then, a solid columnar iron bar having a diameter of 12 mm was prepared as an axis body, and an adhesive was applied to its outer peripheral surface. This axis body was set in a hollow space of a mold for roll forming, and then the prepared composition for formation of a rubber elastic body was injected into the hollow space, heated at 190° C. for 30 minutes to be cured, and demolded.

This way, a plurality of roll members r with a mono-layer structure having a layered rubber elastic body mainly composed of NBR (thickness: 2 mm) on the outer periphery of the axis body were prepared.

TABLE 2

| | | Photocurable composition | | | | | | | | | |
|---|---|---|---|---|---|---|---|---|---|---|---|
| | | 1 | 2 | 3 | 4 | 5 | 6 | 7 | 8 | 9 | 10 |
| Composition (parts by mass) | Pentaerythritol triacrylate | 100 | 100 | 100 | 100 | 100 | 100 | 100 | | 100 | 100 |
| | Synthetic liquid A containing photopolymerizable polymer A (20 wt % solution) | 5 | — | — | — | — | — | — | 500 | — | 5 |
| | Synthetic liquid B containing photopolymerizable polymer B (20 wt % solution) | — | 5 | — | — | — | — | — | — | — | — |
| | Synthetic liquid C containing photopolymerizable polymer C (20 wt % solution) | — | — | 5 | — | — | — | — | — | — | — |
| | Synthetic liquid D containing photopolymerizable polymer D (20 wt % solution) | — | — | — | 5 | — | — | — | — | — | — |
| | Synthetic liquid E containing photopolymerizable polymer E (20 wt % solution) | — | — | — | — | 5 | — | — | — | — | — |
| | Synthetic liquid F containing polymer F (20 wt % solution) | — | — | — | — | — | 5 | — | — | — | — |
| | Synthetic liquid G containing polymer G (20 wt % solution) | — | — | — | — | — | — | 5 | — | — | — |
| | Photopolymerization initiator | 5 | 5 | 5 | 5 | 5 | 5 | 5 | 5 | 5 | 5 |
| | MEK | 420 | 420 | 420 | 420 | 420 | 420 | 420 | 20 | 420 | 3423 |
| | Solid content of photocurable composition (wt %) | 20 | 20 | 20 | 20 | 20 | 20 | 20 | 20 | 20 | 3 |

<Preparation of a Roll Member as Material to be Treated>

A roll member as a material to be treated, to which surface treatment with a photocurable composition was to be applied, was prepared as follows.

100 Parts by mass of NBR (manufactured by JSR Corporation; "N222L"), 5 parts by mass of zinc oxide, 2 parts by mass of stearic acid, 1 part by mass of tetrabutylammonium perchlorate (reagent), 0.8 parts by mass of powdery sulfur and 10 parts by mass of a polyester plasticizer (manufactured by DIC Corporation; "Polycizer W-4000") were kneaded for 10 minutes by means of a sealed mixer where the temperature was controlled to 50° C., thereby preparing a composition for a rubber elastic body.

<Preparation of a Blade Member as Material to be Treated>

A blade member as a material to be treated, to which surface treatment with a photocurable composition was to be applied, was provided as follows.

Firstly, a main agent liquid (urethane prepolymer) in a polyurethane composition and a curing agent liquid were prepared. Specifically, MDI (manufactured by Nippon Polyurethane Industry Co., Ltd.; "MILLIONATE MT") and polybutylene adipate (manufactured by Nippon Polyurethane Industry Co., Ltd.; "NIPPOLAN 4010" (Mn: 2000) (hereinafter referred to as PBA)) were used to add 56 parts by mass of MDI to 44 parts by mass of PBA vacuum-defoamed at 80° C. for 1 hour. Thereafter, they were reacted under the condition of 80° C.×3 hour in a nitrogen atmosphere for preparation, thereby obtaining a main agent liquid having a content of NCO with an isocyanate group at its end of 17 mass %. Also, PBA was heated at 150° C. for 1 hour in a nitrogen atmosphere, and 1,4-BD (manufactured by Mitsubishi Chemical Corporation; 1,4-butanediol) and TMP (manufactured by Koei Perstorp Co., Ltd.; trimethylolpropane) were mixed therewith in a ratio of 6/4. Further, triethylenediamine (manufactured by Sankyo Air Products Co., Ltd.; "DABCO") was further formulated, and the mixture was vacuum-defoamed and dehydrated at 80° C. for 1 hour in a nitrogen atmosphere, thereby obtaining a curing agent liquid with a hydroxyl group at its end having an OH value of 210.

Next, a mold composed of upper and lower molds was provided. The upper and lower molds are brought closer to each other and clamped so that a cavity having a size for two blade members is formed within the mold. This cavity is provided with two housing parts opposed to each other. These respective housing parts are configured so that one side edge on the tip end side of a holding part can be arranged therein.

Then, a holding part formed by bending a metal plate as shown in FIGS. 3 and 4 was set in each of the housing parts in the mold, and the mold was clamped. Thereafter, the main agent liquid (urethane prepolymer) in the polyurethane composition and curing agent liquid were injected into the cavity, and heated at 140° C. for 30 minutes, thereby curing the composition. Thereafter, the formed product was removed from the mold, and cut into two pieces having a predetermined size.

So, a plurality of blade members b having a blade part formed from a planar rubber elastic body (thickness: 2 mm) mainly composed of urethane rubber and a holding part which holds the blade part on the outer periphery of the axis body were provided.

<Production of Roll Members of Samples R1 to R9>

The predetermined photocurable compositions indicated in Table 3 were impregnated into the rubber elastic body of the roll member r as the above-provided material to be treated. Specifically, the roll member r was immersed for 10 seconds in liquids of the predetermined photocurable compositions at a temperature of 25° C., and then allowed to stand at a temperature of 25° C. for 10 minutes for impregnation of the photocurable compositions.

Then, ultraviolet rays (UV) were applied to the surface of the rubber elastic body after the impregnation of the photocurable compositions using an ultraviolet irradiation device (manufactured by EYE GRAPHICS CO., LTD.; "UB031-2A/BM"). Thus, the specific photocurable compositions were cured to form respective surface-treated layers. At this time, the distance between an ultraviolet lamp (mercury lamp type) of the ultraviolet irradiation device and the surface of the rubber elastic body was defined as 200 mm. Also, ultraviolet irradiation was carried out under the conditions: ultraviolet intensity: 100 mW/cm$^2$ and irradiation time: 30 seconds, whereby roll members of samples R1 to R9 were prepared.

<Production of a Roll Member of Sample R10>

The roll member of sample R10 was prepared in a similar manner as in the preparation of the roll member of sample R1, except that ultraviolet irradiation was carried out without impregnation of the photocurable composition into the rubber elastic body from the surface thereof.

<Production of a Blade Member of Sample B1>

The predetermined photocurable composition as shown in Table 4 was impregnated into the rubber elastic body forming the blade part of a blade member b as the material to be treated from the surface thereof. Specifically, the blade part was immersed for 10 seconds in a liquid of the predetermined photocurable composition at a temperature of 25° C., and then allowed to stand at a temperature of 25° C. for 10 minutes for impregnation of the photocurable composition.

Then, ultraviolet rays (UV) were applied to the surface of the blade part after the impregnation of the above-described specific photocurable composition using the ultraviolet irradiation device. Thus, the specific photocurable composition was cured to form a surface-treated layer. At this time, the distance between an ultraviolet lamp (mercury lamp type) of the ultraviolet irradiation device and the surface of the blade part was defined as 200 mm. Also, ultraviolet irradiation was carried out under the conditions of ultraviolet intensity of 100 mW/cm$^2$ and irradiation time of 30 seconds, whereby a blade member of sample B1 was prepared.

<Production of Blade Members of Samples B2 and B3>

A blade member of sample B2 was prepared in a similar manner as in the preparation of the blade member of sample B1, except that ultraviolet irradiation was carried out without impregnation of the photocurable composition the rubber elastic body forming the blade part from the surface thereof. Also, a blade member of sample B3 was prepared in a similar manner as in the preparation of the blade member of sample B1, except that no impregnation of the photocurable composition into the surface of the rubber elastic body forming the blade part was carried out and further that no ultraviolet irradiation was carried out.

<Toner Releasability>

(Toner Fixing Test)

The roll member and blade member were introduced into a thermal tank under the conditions of 50° C. and 95% humidity in the state where a yellow toner of a color laser beam printer (manufactured by Canon Inc.; "LBP5050") was uniformly sprinkled onto the surfaces of the roll members of the samples and the surfaces of the blade parts in the blade members for the samples. Then, the roll members and blade members were removed and cooled to room temperature, and then their surfaces were air-blown. Thereafter, the surfaces of the roll members and blade members were observed with a laser microscope (manufactured by KEYENCE CORPORATION; "VK-X200"). The case where the toner fixing area to the respective total surface areas was 5% or less was evaluated as "A" which means excellent toner releasability in the toner fixing test. Also, the case where the area of the fixed toner was from more than 5% to 15% or less was evaluated as "B" which means good toner releasability in the toner fixing test. The case where the toner fixing area was more than 15% was evaluated as "C" which means poor toner releasability in the toner fixing test.

(Durability Test for a Real Machine)

The roll members of the samples were incorporated, as developing rolls, into a commercially-available color printer (manufactured by Hewlett-Packard Japan, Ltd.; "Color Laser Jet 4700dn") to visually evaluate the fixing state of the toner to the surfaces of the roll members after 20,000-sheet printing. The case of no filming due to fixing of the toner onto the surface was evaluated as "A" which means excellent toner releasability in the real machine durability test. Also, the case where fixing of the toner to the surface was observed, but was tolerable because of almost no influence on image quality was evaluated as "B" which means good toner releasability in the real machine durability test. The case of occurrence of filming due to fixing of the toner to the surface was evaluated as "C" which means poor toner releasability in the real machine durability test.

<Friction Coefficient>
(Initial Dynamic Friction Coefficient)

A vertical load W of 100 g by a contactor (made of a steel ball having a diameter of 3 mm) was applied to the surfaces of the roll members of the samples fixed on the stage of a static/dynamic friction coefficient measurement instrument (manufactured by Kyowa Interface Science Co., Ltd.; "Triboster500") or the surfaces of the blade parts in the blade members of the samples fixed on the stage, and the stage was moved by 1 cm in the horizontal direction at a movement speed of 7.5 mm/sec. in this state. Thus, initial dynamic friction coefficients (F/W) of the roll member surfaces and blade part surfaces were calculated from the friction force F generated between the contactor and the roll members of the samples and between the contactor and the blade parts in the blade members of the samples.

(Dynamic Friction Coefficient after Toner Fixing Test)

The surfaces of the roll members of the samples and the blade parts in the blade members of the samples after the toner fixing test were carefully wiped off with a nonwoven cloth impregnated with methanol. Thereafter, for these roll member surfaces and blade part surfaces, the dynamic friction coefficient after the toner fixing test were calculated in a similar manner as in the measurement of the initial dynamic friction coefficient.

<Peeling Resistance>

The blade members of the samples were incorporated, as cleaning blades, into a toner cartridge of a commercially-available color printer (manufactured by Hewlett-Packard Japan, Ltd.; "Color Laser Jet 4700dn"), and subjected to the 30,000-sheet imaging in a H/H environment (35° C.×85% RH). The blade member which did not produce peeling during the 30,000-sheet imaging was evaluated as "A." The blade member which produced peeling during imaging of 10,000 sheets to less than 30,000 sheets was evaluated as "B." The blade member which produced peeling during imaging of less than 10,000 sheets was evaluated as "C." In the meantime, the term "peeling" refers to a phenomenon that the cleaning blade accompanies the rotation of a photoconductive drum and is inverted due to a high friction coefficient of the blade part of the cleaning blade, so that cleaning cannot be carried out.

The above-described evaluation results are summarized in Tables 3 and 4.

TABLE 4

|  | Sample B1 | Sample B2 | Sample B3 |
|---|---|---|---|
| Photocurable composition used in formation of surface-treated layer | 10 | — | — |
| Light irradiation | UV | UV | — |
| Evaluation Toner releasability Toner fixing text | A | B | B |
| Low friction property Initial dynamic friction coefficient | 0.5 | 2.1 | 2.2 |
| Dynamic friction coefficient after toner fixing test | 0.5 | 2.0 | 2.0 |
| Peeling resistance | A | C | C |

According to the above-described results, the following can be found. None of samples R10, B2 and B3 were impregnated with a photocurable composition from the surface of the rubber elastic body, and have a surface-treated layer composed of a cured product of the photocurable composition. Therefore, all of samples R10, B2 and B3 fail to attain toner releasability and low friction property at the same time.

All of samples R5 to R9 were impregnated with a photocurable composition from the surface of the rubber elastic body, and then subjected to ultraviolet irradiation, and thus have a surface-treated layer composed of a cured product of the photocurable composition impregnated. However, the sample R5 employs the photopolymerizable polymer E having no silicone group and no fluorine-containing group in its molecule. Samples 6 and 7 employ the photopolymerizable polymers F and G, respectively, having no (meth) acryloyl group in their molecules. For sample 8, no (meth) acryl monomer is contained in the photocurable composition. For sample 9, a photopolymerizable polymer having a silicone group and/or a fluorine-containing group and a (meth)acryloyl group in its molecule is not contained in the photocurable composition. Therefore, all of samples R5 to R9 fail to attain toner releasability and low friction property at the same time.

TABLE 3

|  |  | Sample R1 | Sample R2 | Sample R3 | Sample R4 | Sample R5 | Sample R6 | Sample R7 | Sample R8 | Sample R9 | Sample R10 |
|---|---|---|---|---|---|---|---|---|---|---|---|
| Photocurable composition used in formation of surface-treated layer | | 1 | 2 | 3 | 4 | 5 | 6 | 7 | 8 | 9 | — |
| Light irradiation | | UV | UV | UV | UV | UV | UV | UV | UV | UV | UV |
| Evaluation | Toner releasability Toner fixing text | A | A | A | A | C | C | C | B | C | C |
| | Durability test for a real machine | A | A | A | B | C | C | C | C | C | C |
| Friction coefficient | Initial dynamic friction coefficient | 0.2 | 0.2 | 0.2 | 0.3 | 1.1 | 0.3 | 0.3 | 0.8 | 1.1 | 1.1 |
| | Dynamic friction coefficient after toner fixing test | 0.2 | 0.2 | 0.3 | 0.3 | 1.2 | 0.8 | 1 | 1.1 | 1.2 | 1.5 |

In contrast to these samples, it was confirmed that all of samples R1 to R4 and B1 can attain both toner mold release property and low friction property. The reason for this is considered to be as follows.

When a photocurable composition is impregnated into a rubber elastic body from the surface thereof, a monomer component, i.e., a (meth)acryl monomer, penetrates inside from the surface of the rubber elastic body, whereas a polymer component, i.e., a photopolymerizable polymer, hardly penetrates inside from the surface of the rubber elastic body and remains on the surface of the rubber elastic body. The photopolymerizable polymer has a silicone group and/or a fluorine-containing group and a (meth)acryloyl group in a molecule. When the photocurable composition is photo-cured in this state, the (meth)acryl monomer present within the rubber elastic body and is chemically bound to a (meth)acryloyl group of the photopolymerizable polymer present on the surface of the rubber elastic body so as to produce a polymer while forming a network. Therefore, the above-described modified rubber elastic body is considered to allow for easy release of powder such as a toner adhered to the surface of the body and also to reduce surface friction, by virtue of synergistic effects of the increased hardness caused by curing of the photocurable composition near the surface of the rubber elastic body and the silicone group and/or fluorine-containing group present mainly on the surface of the rubber elastic body.

While Examples of the present invention have been explained in detail, the present invention is not limited to the above-described Examples, and can be variously modified to the extent that the purport of the present invention is not impaired.

The invention claimed is:

1. An electrophotographic device member for use in an electrophotographic device comprising:
    a modified rubber elastic body as a material for a portion including a surface of the electrophotographic device member,
    the modified rubber elastic body comprising
        a rubber elastic body with rubber elasticity; and
        a surface-treated layer composed of a cured product of photocurable composition impregnated into the rubber elastic body from the surface of the rubber elastic body,
    the photocurable composition comprising:
        a (meth)acrylic monomer;
        a photopolymerizable polymer having a silicone group and/or a fluorine-containing group, and a (meth)acryloyl group in a molecule; and
        a photopolymerization initiator.

2. The electrophotographic device member according to claim 1,
    wherein the photopolymerizable polymer is composed of a copolymer comprising:
        a first polymerization unit; and/or
        a second polymerization unit; and
        a third polymerization unit,
        the first polymerization unit being derived from a (meth)acrylate having a silicone group in a molecule,
        the second polymerization unit being derived from a (meth)acrylate having a fluorine-containing group in a molecule, and
        the third polymerization unit being derived from a (meth)acrylate having an hydroxyl group in a molecule, the hydroxyl group being chemically modified with a molecule having a (meth)acryloyl group.

3. The electrophotographic device member according to claim 2,
    wherein the copolymer further comprises a fourth polymerization unit derived from a (meth)acrylate having an alkyl group.

4. The electrophotographic device member according to claim 1,
    wherein the silicone group comprises a polydimethylsiloxane skeleton formed by repetition of a dimethylsiloxane unit, and
    wherein the fluorine-containing group is a perfluoroalkyl group.

5. The electrophotographic device member according to claim 2,
    wherein the silicone group comprises a polydimethylsiloxane skeleton formed by repetition of a dimethylsiloxane unit, and
    wherein the fluorine-containing group is a perfluoroalkyl group.

6. The electrophotographic device member according to claim 3,
    wherein the silicone group comprises a polydimethylsiloxane skeleton formed by repetition of a dimethylsiloxane unit, and
    wherein the fluorine-containing group is a perfluoroalkyl group.

7. The electrophotographic device member according to claim 3,
    wherein the (meth)acrylate having the alkyl group is methyl methacrylate or butyl methacrylate.

8. The electrophotographic device member according to claim 1,
    wherein the surface-treated layer has a number of the silicone groups and/or the fluorine-containing groups on a surface side of the surface-treated layer.

9. The electrophotographic device member according to claim 2,
    wherein the surface-treated layer has a number of the silicone groups and/or the fluorine-containing groups on a surface side of the surface-treated layer.

10. The electrophotographic device member according to claim 3,
    wherein the surface-treated layer has a number of the silicone groups and/or the fluorine-containing groups on a surface side of the surface-treated layer.

11. The electrophotographic device member according to claim 1,
    wherein the photopolymerizable polymer is at least one kind selected from polymers having molecular structures represented by the following formulae (1) and (2):

[Chemical Formula 1]

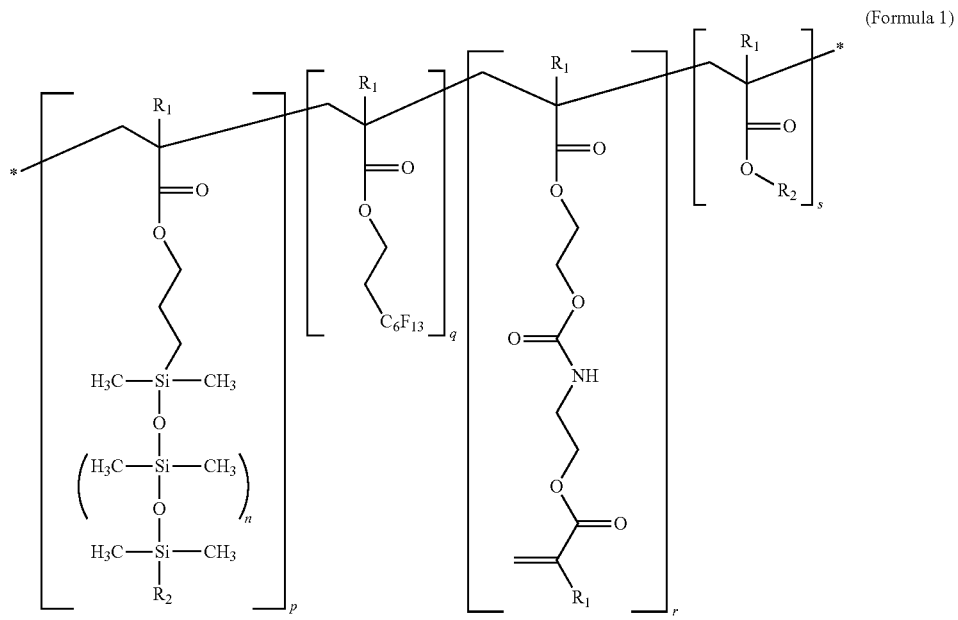

(Formula 1)

(wherein $R_1$ represents H or $CH_3$; $R_2$ represents an alkyl group; p ranges from 0 to 60, q ranges from 0 to 60, r ranges from 0.01 to 60, s ranges from 0 to 95 by mol %, provided that p+q≠0; and n is an integer of 2 to 270)

[Chemical Formula 2]

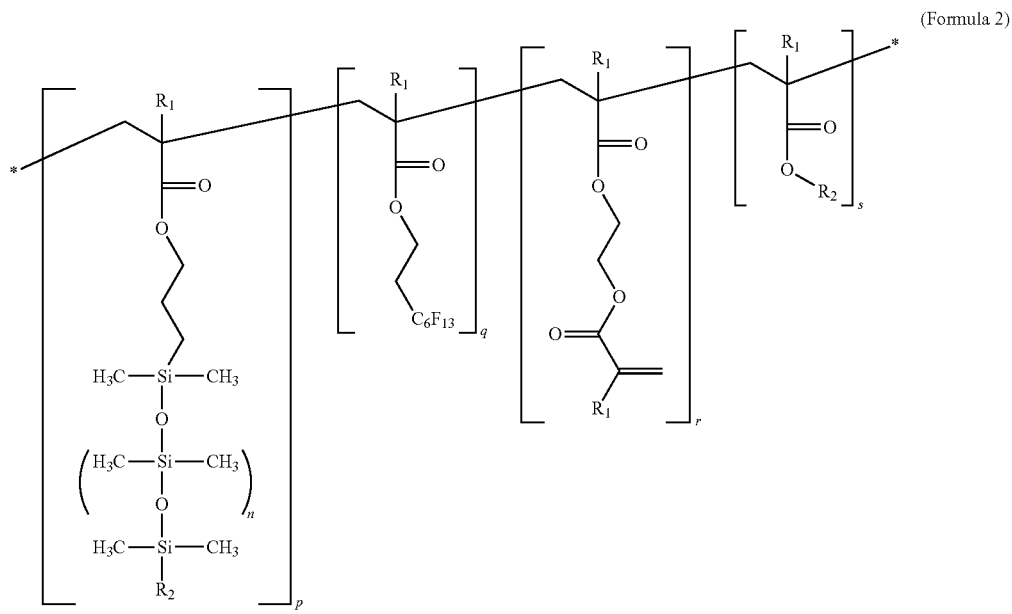

(Formula 2)

(wherein $R_1$ represents H or $CH_3$; $R_2$ represents an alkyl group; p ranges from 0 to 60, q ranges from 0 to 60, r ranges from 0.01 to 60, s ranges from 0 to 95 by mol %, provided that p+q≠0; and n is an integer of 2 to 270.

12. The electrophotographic device member according to claim 11, wherein the surface-treated layer has a number of the silicone groups and/or the fluorine-containing groups on a surface side of the surface-treated layer.

13. The electrophotographic device member according to claim 1, wherein the (meth)acrylic monomer is a polyfunctional monomer having a plurality of (meth)acryloyl groups.

14. The electrophotographic device member according to claim 2, wherein the (meth)acrylic monomer is a polyfunctional monomer having a plurality of (meth)acryloyl groups.

15. The electrophotographic device member according to claim 3,
wherein the (meth)acrylic monomer is a polyfunctional monomer having a plurality of (meth)acryloyl groups.

16. The electrophotographic device member according to claim 12,
wherein the (meth)acrylic monomer has a number average molecular weight within the range of 200 to 700.

17. The electrophotographic device member according to claim 1, which is a developing member, an electrifying member, a transferring member or a cleaning member to be incorporated into an electrophotographic image forming device.

18. The electrophotographic device member according to claim 2, which is a developing member, an electrifying member, a transferring member or a cleaning member to be incorporated into an electrophotographic image forming device.

19. The electrophotographic device member according to claim 3, which is a developing member, an electrifying member, a transferring member or a cleaning member to be incorporated into an electrophotographic image forming device.

20. The electrophotographic device member according to claim 11, which is a developing member, a charging member, a transferring member or a cleaning member to be incorporated into an electrophotographic image forming device.

* * * * *